(12) United States Patent
Propheter-Hinckley

(10) Patent No.: US 12,655,765 B1
(45) Date of Patent: Jun. 16, 2026

(54) METHOD FOR REPAIRING VANE OF GAS TURBINE ENGINE

(71) Applicant: RTX Corporation, Farmington, CT (US)

(72) Inventor: Tracy A. Propheter-Hinckley, Rocky Hill, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/232,409

(22) Filed: Jun. 9, 2025

(51) Int. Cl.
*F01D 5/00* (2006.01)
*B23P 6/00* (2006.01)

(52) U.S. Cl.
CPC .............. *F01D 5/005* (2013.01); *B23P 6/007* (2013.01); *F05D 2230/237* (2013.01); *F05D 2230/80* (2013.01)

(58) Field of Classification Search
CPC .... F01D 5/005; B23P 6/007; F05D 2230/237; F05D 2230/80
See application file for complete search history.

(56) References Cited

U.S. PATENT DOCUMENTS

| | | | |
|---|---|---|---|
| 10,502,058 B2 | 12/2019 | Chabane | |
| 10,927,684 B2 | 2/2021 | Bogue | |
| 12,508,675 B1 * | 12/2025 | Henderson | ......... B23K 35/0233 |

* cited by examiner

*Primary Examiner* — Lee A Holly
(74) *Attorney, Agent, or Firm* — Getz Balich LLC

(57) ABSTRACT

A method for repairing a component of a gas turbine engine is provided. The method includes perforating apertures through a braze tape based on a shape of a degraded region of the component, and applying the braze tape to the component such that the braze tape covers the degraded region and the apertures surround a perimeter of the degraded region. The method also includes bonding the braze tape and the component via a thermal brazing treatment, and contouring the braze tape to conform to an original profile of the component based on monitoring depths of the apertures.

20 Claims, 5 Drawing Sheets

100

METHOD FOR REPAIRING VANE OF GAS TURBINE ENGINE

TECHNICAL FIELD

This disclosure relates generally to gas turbine engines and, more particularly, to a method for repairing a stationary vane of a gas turbine engine.

BACKGROUND OF THE ART

Propulsion systems for aircraft may typically include a gas turbine engine with a turbine vane structure arranged downstream of a combustor. Various methods of repairing damaged turbine vanes are known in the art. While these known methods may be suitable for their intended purposes, there is always room in the art for improvement.

SUMMARY

According to an aspect of the present disclosure, a method for repairing a component of a gas turbine engine is provided. The method includes perforating apertures through a braze tape based on a shape of a degraded region of the component, and applying the braze tape to the component such that the braze tape covers the degraded region and the apertures surround a perimeter of the degraded region. The method also includes bonding the braze tape and the component via a thermal brazing treatment, and contouring the braze tape to conform to an original profile of the component based on monitoring depths of the apertures.

In any of the aspects or embodiments described above and herein, the method may further include sizing and cutting the braze tape to cover the degraded region.

In any of the aspects or embodiments described above and herein, the method may further include applying a braze-resist coating to interior surfaces of the apertures to block migration of a braze alloy of the braze tape into to the apertures during the thermal brazing treatment.

In any of the aspects or embodiments described above and herein, the braze tape may include a diffusion braze tape. Bonding the braze tape and the component via the thermal brazing treatment may include heating the diffusion braze tape and the component to a brazing temperature to diffuse the braze alloy into the component, and cooling the diffusion braze tape and the component from the brazing temperature to an ambient temperature.

In any of the aspects or embodiments described above and herein, in applying the braze tape, the apertures may overlie an undamaged surface of the component.

In any of the aspects or embodiments described above and herein, contouring the braze tape may include grinding excess material from the braze tape based on the original profile of the component while monitoring the depths of the apertures, and ceasing the grinding based on an increased exposure of the undamaged surface of the component at locations of the apertures.

In any of the aspects or embodiments described above and herein, contouring the braze tape may include blending a ground area of the braze tape between the locations of the apertures to restore the original profile of the component.

In any of the aspects or embodiments described above and herein, perforating the apertures may include determining a number of the apertures based on the shape of the degraded region.

In any of the aspects or embodiments described above and herein, the number of the apertures may correlate with a magnitude of curvature variation in the shape of the degraded region.

In any of the aspects or embodiments described above and herein, the component may include a vane of the gas turbine engine or an airfoil of the vane.

According to an aspect of the present disclosure, a method for repairing a component of a gas turbine engine is provided. The method includes perforating apertures through a braze tape based on a shape of a degraded region of the component, and applying the braze tape to the component such that the braze tape covers the degraded region and the apertures overlie an undamaged surface of the component. The method also includes bonding the braze tape and the component, and grinding excess material from the braze tape based on an original profile of the component while monitoring depths of the apertures. The method further includes ceasing the grinding based on an increased exposure of the undamaged surface of the component at locations of the apertures.

In any of the aspects or embodiments described above and herein, the method may further include sizing and cutting the braze tape to cover the degraded region.

In any of the aspects or embodiments described above and herein, the method may further include applying a braze-resist coating to interior surfaces of the apertures to block migration of a braze alloy of the braze tape into to the apertures during bonding.

In any of the aspects or embodiments described above and herein, the braze tape may include a diffusion braze tape. Bonding the braze tape and the component may include heating the diffusion braze tape and the component to a brazing temperature to diffuse the braze alloy into the component, and cooling the braze tape and the component from the brazing temperature to an ambient temperature.

In any of the aspects or embodiments described above and herein, the method may further include blending a ground area of the braze tape between the locations of the apertures to restore the original profile of the component.

In any of the aspects or embodiments described above and herein, perforating the apertures may include determining a number of the apertures based on the shape of the degraded region.

In any of the aspects or embodiments described above and herein, the number of the apertures may correlate with a magnitude of curvature variation in the shape of the degraded region.

In any of the aspects or embodiments described above and herein, the component may include a vane of the gas turbine engine or an airfoil of the vane.

In any of the aspects or embodiments described above and herein, the degraded region may include a thermally degraded region.

According to an aspect of the present disclosure, a method for repairing a component of a gas turbine engine is provided. The method may include perforating apertures through a braze tape based on a shape of a degraded region of the component, and applying the braze tape to the component such that the braze tape covers the degraded region. The method may also include applying a braze-resist coating to interior surfaces of the apertures, and bonding the braze tape and the component via a thermal brazing treatment, wherein the braze-resist coating blocks migration of a braze alloy of the braze tape into the apertures. The method may further include contouring the braze tape to conform to an original profile of the component based on monitoring depths the apertures.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
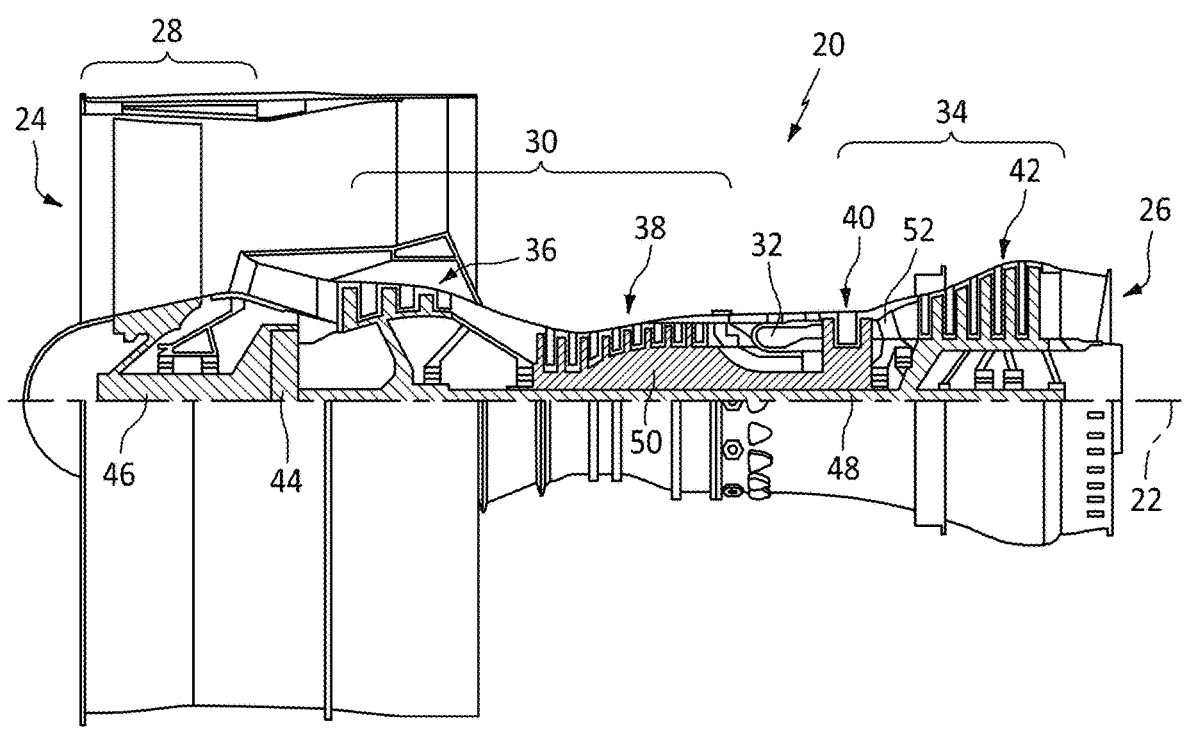
FIG. 1 schematically illustrates a cutaway, side view of a gas turbine engine, in accordance with one or more embodiments of the present disclosure.

FIG. 1 schematically illustrates a cutaway, side view of a gas turbine engine 20 for a propulsion system. The present disclosure is not limited to any particular configuration of gas turbine engine for the propulsion system, and examples of gas turbine engine configurations for the propulsion system may include, but are not limited to, a turbofan engine, a turbojet engine, a propfan engine, or the like.

The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The compressor section 30 includes a low pressure compressor (LPC) 36 and a high pressure compressor (HPC) 38. The turbine section 34 includes a high pressure turbine (HPT) 40 and a low pressure turbine (LPT) 42. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low speed shaft 48. The HPC 38 is connected to and driven by the HPT 40 through a high speed shaft 50.

During operation, air enters the gas turbine engine 20 through the upstream airflow inlet 24 and is directed through the fan section 28 and into a core gas path or a bypass gas path. The air within the core gas path may be referred to as "core air". The air within the bypass gas path may be referred to as "bypass air". The core air is directed through the engine sections 30, 32, 34 and exits the gas turbine engine 20 through the downstream airflow exhaust 26 to provide forward engine thrust. Within the combustor section 32, fuel is injected into a combustion chamber and mixed with compressed core air. This fuel-core air mixture is ignited to power the gas turbine engine 20. The bypass air is directed through the bypass gas path and out of the gas turbine engine 20 through a bypass nozzle to provide additional forward engine thrust.

As shown schematically in FIG. 1, the gas turbine engine 20 also includes a stator vane assembly 52 located axially between the HPT 40 and the LPT 42. The stator vane assembly 52 is connected to a static case such that aerodynamic loads on the stator vane assembly 52 transfer to the static case.

Figure 2:
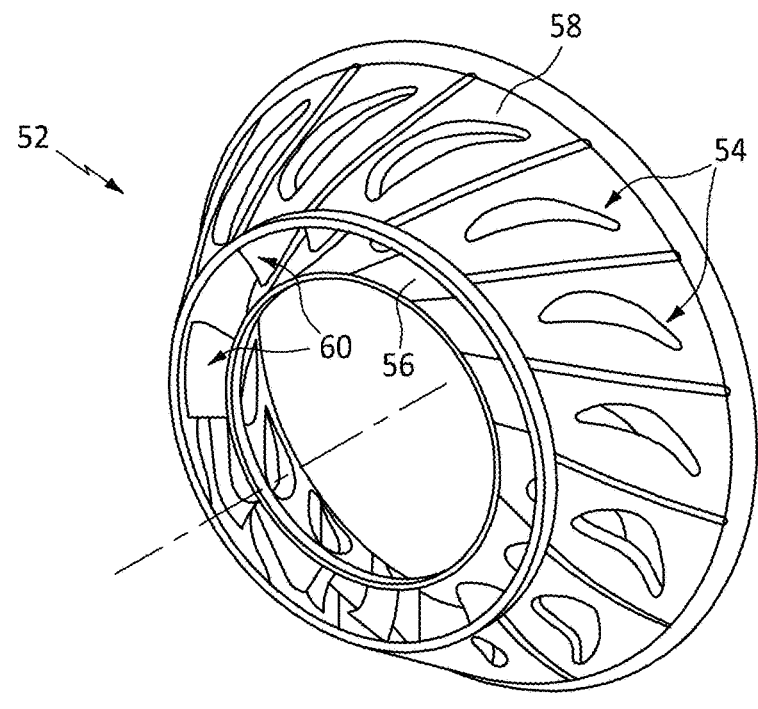
FIG. 2 schematically illustrates a perspective view of a stator vane assembly, in accordance with one or more embodiments of the present disclosure.

FIG. 2 schematically illustrates a perspective view of the stator vane assembly 52. The stator vane assembly 52 includes a plurality of distinct vane segments 54. Each of the vane segments 54 includes an inner radial platform 56, an outer radial platform 58, and at least one airfoil 60 connected at opposite ends thereof to the inner and outer radial platforms 56, 58. In other examples, there may be more than one airfoil 60 connected to the inner and outer radial platforms 56, 58.

The present disclosure is not limited to the particular stator vane assembly 52 of FIGS. 1 and 2, and may be applicable to any stator vane assembly in the gas turbine engine 20 subject to thermal degradation. With respect to the stator vane assembly 52, vanes direct high temperature gases from the combustor section 32 onto rotating turbine blades, regulate core air flow through the core gas path of the gas turbine engine 20, and channel cooling air to downstream components. The temperature of the core air exiting the combustor section 32 is seldom uniform around a circumference of the core gas path, resulting in varying temperature regions. Unlike turbine blades that average their temperature exposures through rotation, stationary vanes are disposed within these thermal gradients throughout engine operation and are particularly susceptible to localized thermal degradation.

Figure 3A:
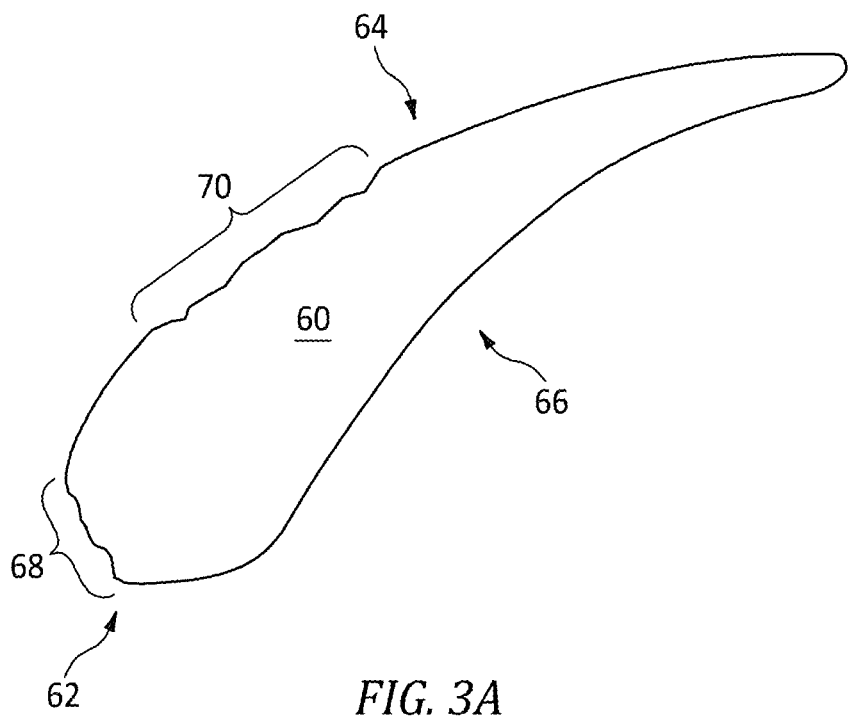
FIG. 3A schematically illustrates a radial, cross-sectional view of an airfoil with degraded regions, in accordance with one or more embodiments of the present disclosure.

FIG. 3A schematically illustrates a radial, cross-sectional view of the airfoil 60 including a leading edge 62, a suction side 64, and a pressure side 66. The leading edge 62 of the airfoil 60 is disposed closest to the combustor section 32 and is the first part of the stator vane assembly 52 to encounter the core air. Due to the flow of the core air, the leading edge 62 and the suction side 64 are more susceptible to thermal degradation. For example, the suction side 64 typically degrades faster than the pressure side 66 because it cannot employ film cooling without sacrificing aerodynamic efficiency. Specifically, any cooling air injected at the suction side 64 may detach the core air and induce turbulence, reducing energy extraction. In contrast, the pressure side 66 benefits from film cooling, as core air presses against the surface and helps keep the film attached. As shown in FIG. 3A, a first degraded region 68 may be disposed at the leading edge 62 and a second degraded region 70 may be disposed at the suction side 64.

Figure 3B:
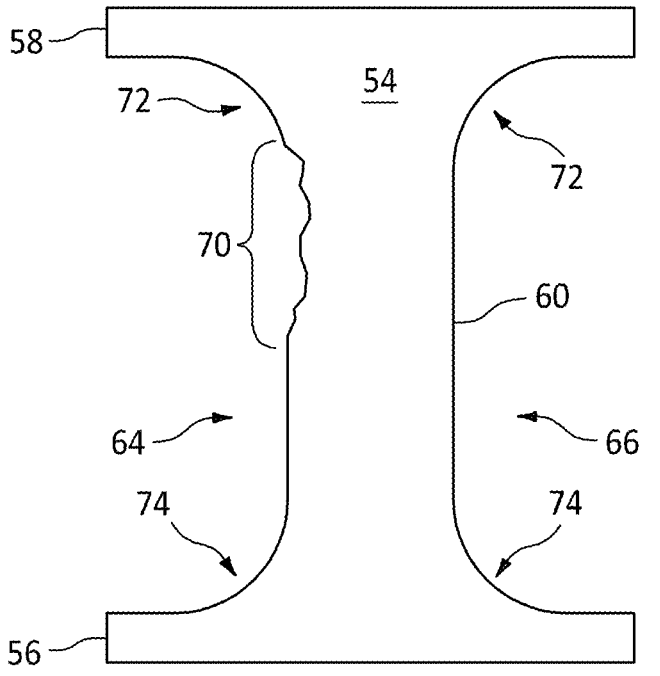
FIG. 3B schematically illustrates an axial, cross-sectional view of a vane segment with a degraded region, in accordance with one or more embodiments of the present disclosure.

FIG. 3B schematically illustrates an axial, cross-sectional view of the vane segment 54 including the inner radial platform 56, the outer radial platform 58, the suction side 64 of the airfoil 60, and the pressure side 66 of the airfoil 60. The shape of the airfoil 60 includes upper fillets 72, which are curved surfaces that connect the suction side 64 and the pressure side 66 to the outer radial platform 58. The shape of the airfoil 60 also includes lower fillets 74, which are curved surfaces that connect the suction side 64 and the pressure side 66 to the inner radial platform 56. The second degraded region 70 may be disposed on the suction side 64 of the airfoil 60 proximate to the outer radial platform 58. As shown in FIG. 3B, the second degraded region 70 may be disposed on an upper half of the suction side 64 proximate to the upper fillet 72.

Thermally degraded airfoils may be repaired through a brazing procedure, in which a braze alloy is applied to the degraded region. Once bonded, excess braze material may be ground back in an attempt to restore an original profile of the airfoil. However, insufficient or excessive griding may affect the aerodynamic profile of the airfoil, and any deviation from the original airfoil profile may negatively impact engine efficiency or even induce engine stall.

Figure 4:
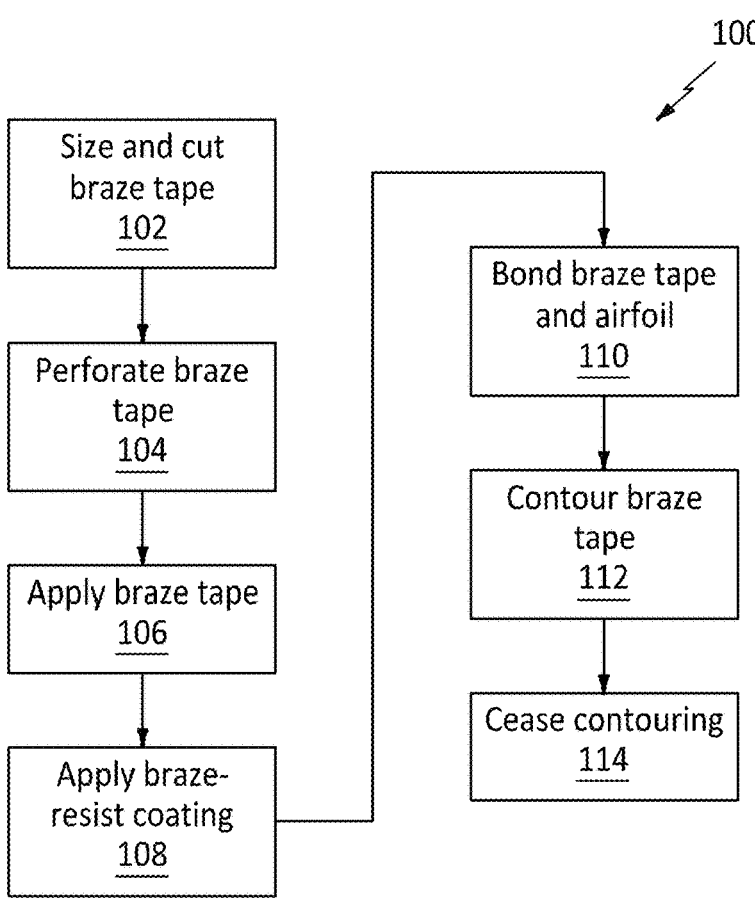
FIG. 4 is a flowchart illustrating a method for repairing a vane having thermal degradation, in accordance with one or more embodiments of the present disclosure.

FIG. 4 is a flowchart 100 illustrating a method for vane repair. At 102, braze tape may be sized and cut to fully cover a degraded region of an airfoil. The present disclosure is not limited to any particular type of braze tape. For example, the braze tape may be diffusion braze tape. At 104, the braze tape may be perforated with a plurality of apertures. Locations of the apertures may be determined such that, when the braze tape is applied to the airfoil, the apertures are disposed over an undamaged surface area of the airfoil that is proximate to a perimeter of the degraded region. The apertures may be approximately 0.05-0.25 inch in diameter, for example. The present disclosure is not limited to any particular manner of perforating the braze tape. Having been both cut and perforated, the braze tape may be applied to the airfoil such that the braze tape covers the degraded region and the apertures surround the perimeter of the degraded region over an undamaged surface of the airfoil, at 106.

Figure 5A:
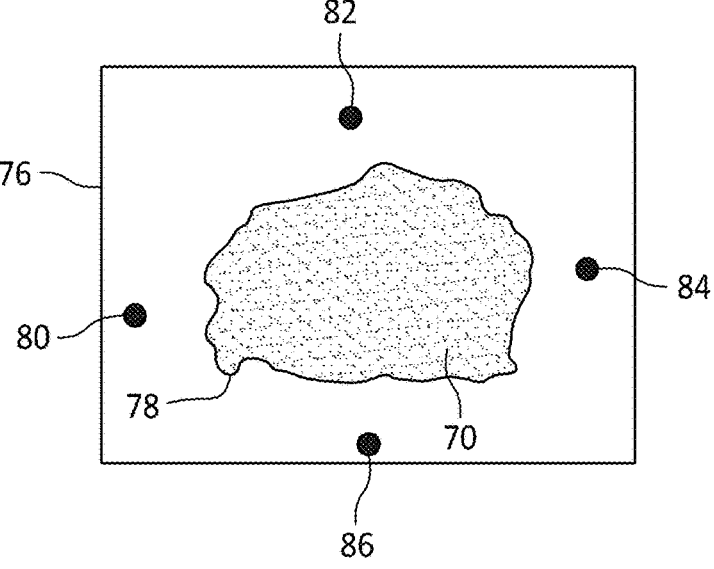
FIG. 5A schematically illustrates a side view of the airfoil with a braze tape applied over the degraded region, in accordance with one or more embodiments of the present disclosure.

FIG. 5A schematically illustrates a side view of the airfoil 60 with a portion of braze tape 76 applied over the second degraded region 70. The braze tape 76 fully covers the second degraded region 70. The braze tape 76 includes a first aperture 80, a second aperture 82, a third aperture 84, and a fourth aperture 86 disposed to surround a perimeter 78 of the second degraded region 70. However, the present disclosure is not limited to any particular number of apertures. The number of apertures may be based on the size, shape, and/or varying curvature of the degraded region. For example, a more complex shape with greater magnitude of curvature variation may require more apertures, while a substantially circular shape with a more constant curvature may require fewer apertures (e.g., four apertures).

Figure 5B:
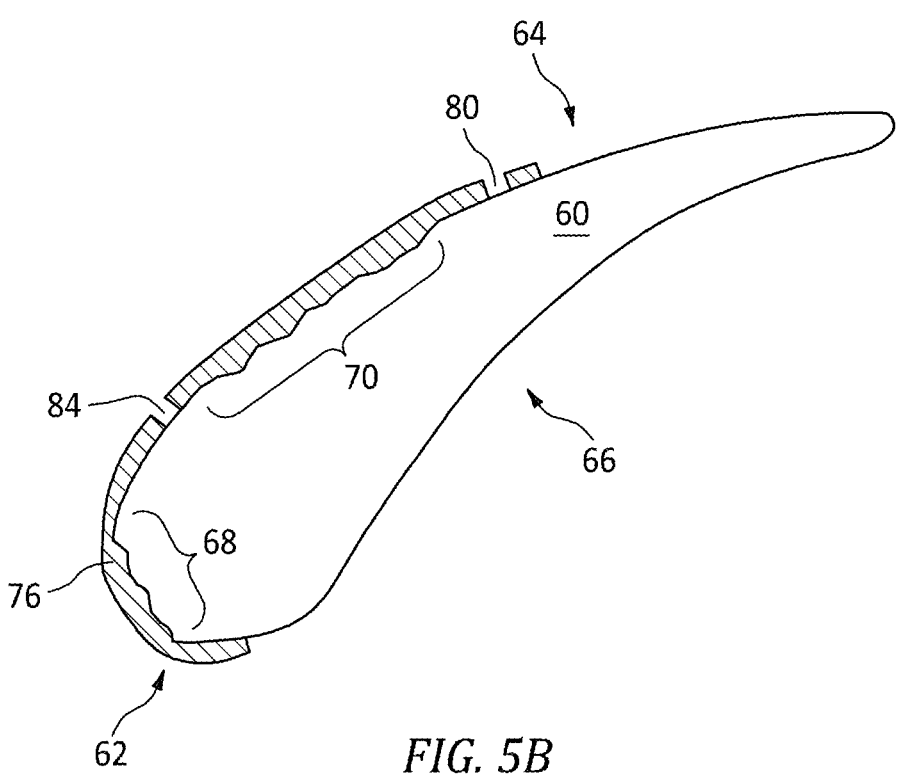
FIG. 5B schematically illustrates a radial, cross-sectional view of the airfoil with the braze tape applied over the degraded regions, in accordance with one or more embodiments of the present disclosure.

FIG. 5B schematically illustrates a radial, cross-sectional view of the airfoil 60 with the braze tape 76 applied over the leading edge 62 and the suction side 64. Specifically, the braze tape 76 is disposed over the first degraded region 68 at the leading edge 62 and extends over the second degraded region 70 at the suction side 64. The first aperture 80 and the third aperture 84 are disposed on opposing sides and proximate to the second degraded region 70. The first aperture 80 and the third aperture 84 are also disposed over an undamaged surface of the airfoil 60.

Figure 5C:
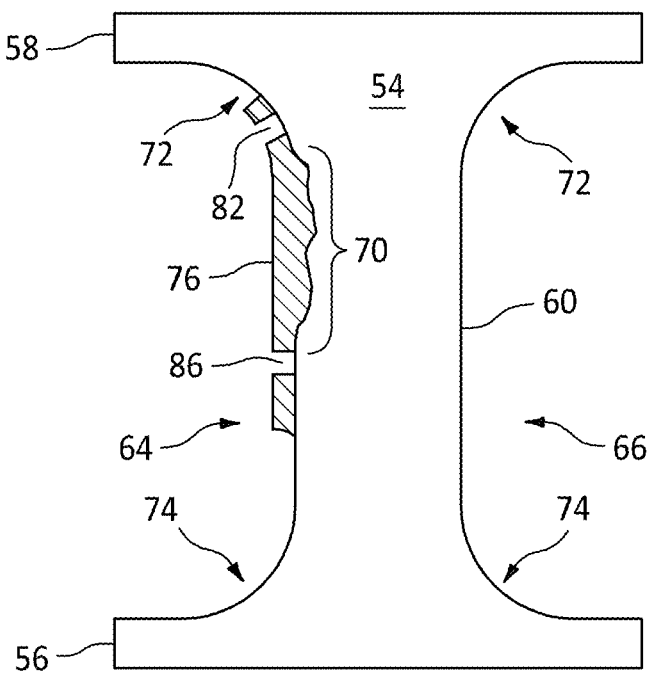
FIG. 5C schematically illustrates an axial, cross-sectional view of the vane segment with the braze tape applied over the degraded region, in accordance with one or more embodiments of the present disclosure.

FIG. 5C schematically illustrates an axial, cross-sectional view of the vane segment 54 with the braze tape 76 applied over the suction side 64 of the airfoil 60. Specifically, the diffusion braze tape 76 is disposed over the second degraded region 70 at the suction side 64. The second aperture 82 and the fourth aperture 86 are disposed on opposing sides and proximate to the second degraded region 70. The second aperture 82 and the fourth aperture 86 are also disposed over an undamaged surface of the airfoil 60.

Referring back to FIG. 4, after application of the braze tape 76, as shown in FIGS. 5A, 5B, and 5C, a braze-resist coating may be applied to interior surfaces of the apertures 80, 82, 84, 86, at 108. The braze-resist coating on the interior surfaces prevents braze, or molten braze alloy, from migrating from the braze tape into the apertures 80, 82, 84, 86 during the diffusion cycle, thereby preserving a clear aperture to the undamaged surface of the airfoil 60. As an alternative, the braze-resist coating may be applied between perforation and application of the braze tape 76.

At 110, the airfoil 60 and braze tape 76 are bonded via a thermal brazing treatment. The present disclosure is not limited to any particular manner of thermal brazing. For example, with respect to diffusion brazing, the diffusion braze tape 76 and the airfoil 60 may be heated to a brazing temperature (or diffusion temperature) that is based on the type of braze alloy, and which diffuses the braze alloy into the airfoil 60. The brazing temperature may be held for a prescribed time to allow for full bonding, before the braze tape 76 and the airfoil 60 are cooled to an ambient temperature.

At 112, the braze tape 76 may be contoured to conform to an original profile of the airfoil 60 while monitoring the apertures. The present disclosure is not limited to any particular manner of contouring the braze tape 76. For example, excess material may be ground from the braze tape 76 while monitoring the resulting depths of the apertures 80, 82, 84, 86. Thus, during grinding, the first through fourth apertures 80, 82, 84, 86 may be utilized as visual cues for the operator to continue or cease grinding. At 114, the operator may cease contouring based on an increased exposure of the undamaged surface of the airfoil 60 at the locations of the apertures 80, 82, 84, 86. For example, the grinding of the braze tape 76 may cease when the apertures 80, 82, 84, 86 are no longer visible.

Figure 6A:
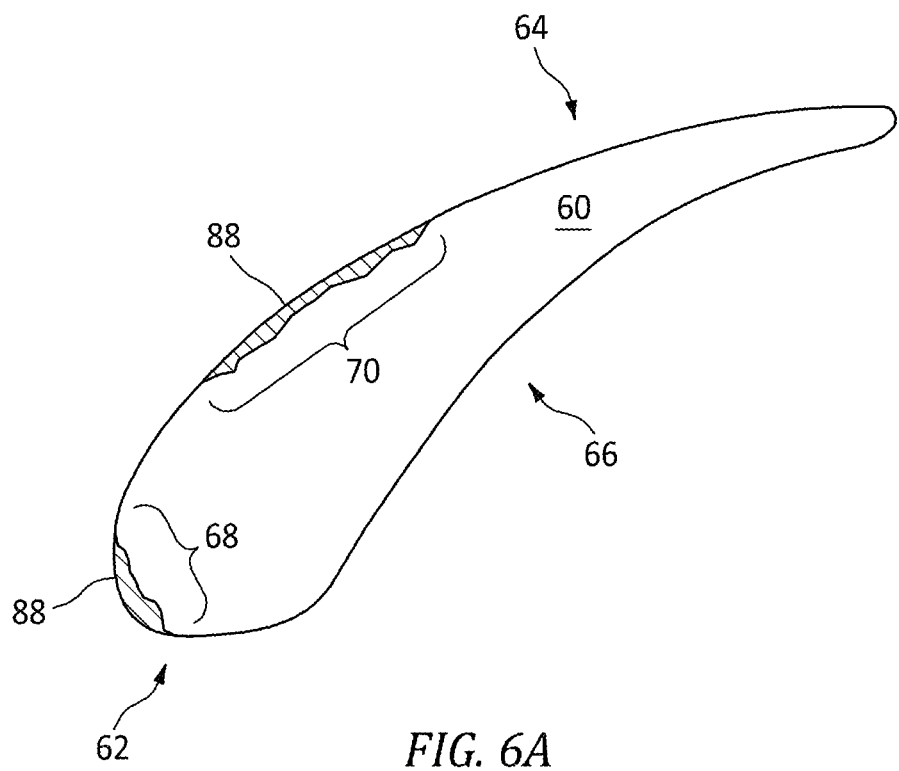
FIG. 6A schematically illustrates a radial, cross-sectional view of the airfoil with contoured braze tape applied over the degraded regions, in accordance with one or more embodiments of the present disclosure.
Figure 6B:
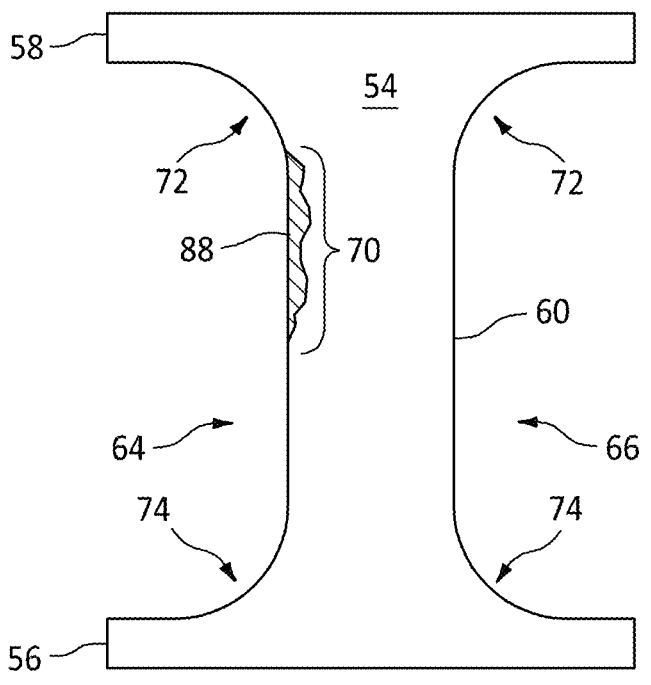
FIG. 6B schematically illustrates an axial, cross-sectional view of the vane segment with the contoured braze tape applied over degraded region, in accordance with one or more embodiments of the present disclosure.

The operator may also perform a blending pass to smooth material between the former aperture locations and over the repaired area of the airfoil 60 to eliminate any roughness and restore the original profile of the airfoil 60. FIGS. 6A and 6B schematically illustrate radial and axial, cross-sectional views with contoured braze tape 88 over the first and second degraded regions 68, 70. The above-described method ensures repair of thermal degradation, more precise restoration of airfoil geometry, and minimal removal of undamaged airfoil surface.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention.

Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for repairing a component of a gas turbine engine, the method comprising:
   perforating apertures through a braze tape based on a shape of a degraded region of the component;
   applying the braze tape to the component such that the braze tape covers the degraded region and the apertures surround a perimeter of the degraded region;
   bonding the braze tape and the component via a thermal brazing treatment; and
   contouring the braze tape to conform to an original profile of the component based on monitoring depths of the apertures.

2. The method of claim 1, further comprising:
   sizing and cutting the braze tape to cover the degraded region.

3. The method of claim 1, further comprising:
   applying a braze-resist coating to interior surfaces of the apertures to block migration of a braze alloy of the braze tape into to the apertures during the thermal brazing treatment.

4. The method of claim 3, wherein the braze tape comprises a diffusion braze tape, and bonding the braze tape and the component via the thermal brazing treatment comprises:
   heating the diffusion braze tape and the component to a brazing temperature to diffuse the braze alloy into the component; and
   cooling the diffusion braze tape and the component from the brazing temperature to an ambient temperature.

5. The method of claim 1, wherein, in applying the braze tape, the apertures overlie an undamaged surface of the component.

6. The method of claim 5, wherein contouring the braze tape comprises:
   grinding excess material from the braze tape based on the original profile of the component while monitoring the depths of the apertures; and
   ceasing the grinding based on an increased exposure of the undamaged surface of the component at locations of the apertures.

7. The method of claim 6, wherein contouring the braze tape further comprises:
   blending a ground area of the braze tape between the locations of the apertures to restore the original profile of the component.

8. The method of claim 1, wherein perforating the apertures comprises:
   determining a number of the apertures based on the shape of the degraded region.

9. The method of claim 8, wherein the number of the apertures correlates with a magnitude of curvature variation in the shape of the degraded region.

10. The method of claim 1, wherein the component comprises a vane of the gas turbine engine or an airfoil of the vane.

11. A method for repairing a component of a gas turbine engine, the method comprising:

perforating apertures through a braze tape based on a shape of a degraded region of the component;

applying the braze tape to the component such that the braze tape covers the degraded region and the apertures overlie an undamaged surface of the component;

bonding the braze tape and the component;

grinding excess material from the braze tape based on an original profile of the component while monitoring depths of the apertures; and ceasing the grinding based on an increased exposure of the undamaged surface of the component at locations of the apertures.

12. The method of claim 11, further comprising:

sizing and cutting the braze tape to cover the degraded region.

13. The method of claim 11, further comprising:

applying a braze-resist coating to interior surfaces of the apertures to block migration of a braze alloy of the braze tape into to the apertures during bonding.

14. The method of claim 13, wherein the braze tape comprises a diffusion braze tape, and bonding the braze tape and the component comprises:

heating the diffusion braze tape and the component to a brazing temperature to diffuse the braze alloy into the component; and cooling the braze tape and the component from the brazing temperature to an ambient temperature.

15. The method of claim 11, further comprising:

blending a ground area of the braze tape between the locations of the apertures to restore the original profile of the component.

16. The method of claim 11, wherein perforating the apertures comprises:

determining a number of the apertures based on the shape of the degraded region.

17. The method of claim 16, wherein the number of the apertures correlates with a magnitude of curvature variation in the shape of the degraded region.

18. The method of claim 11, wherein the component comprises a vane of the gas turbine engine or an airfoil of the vane.

19. The method of claim 11, wherein the degraded region comprises a thermally degraded region.

20. A method for repairing a component of a gas turbine engine, the method comprising:

perforating apertures through a braze tape based on a shape of a degraded region of the component;

applying the braze tape to the component such that the braze tape covers the degraded region;

applying a braze-resist coating to interior surfaces of the apertures;

bonding the braze tape and the component via a thermal brazing treatment, wherein the braze-resist coating blocks migration of a braze alloy of the braze tape into the apertures; and contouring the braze tape to conform to an original profile of the component based on monitoring depths the apertures.

* * * * *